United States Patent Office 3,546,264
Patented Dec. 8, 1970

---

3,546,264
PROCESS FOR PRODUCTION OF ALLYL RUTHENIUM TRICARBONYL HALIDES
Piero Pino, Zurich, Switzerland, and Glauco Sbrana and Giuseppe Braca, Pisa, Italy, assignors to Lonza Ltd., Gampel, Valais, Switzerland, a corporation of Switzerland
No Drawing. Filed Sept. 16, 1968, Ser. No. 762,345
Claims priority, application Switzerland, Sept. 15, 1967, 12,944/67
Int. Cl. C07c *39/08;* C07f *15/00*
U.S. Cl. 260—429                                    7 Claims

ABSTRACT OF THE DISCLOSURE

A process for the production π-allyl ruthenium tricarbonyl halides wherein ruthenium tetracarbonyl trimer is reacted with allyl halides in an organic solvent at temperatures within the range 50–90° C. and an inert atmosphere. The compounds have utility as catalysts in carbonylization reactions.

BACKGROUND OF THE INVENTION

The production of allyl-ruthenium carbonyl derivatives has received very little attention in the prior art. Only one reference to the synthesis of a specific compound, tricarbonyl (1-methyl-π-allyl)—ruthenium chloride, has been previously disclosed. Such a compound has been prepared through treatment of 1,3-butadiene with ruthenium tricarbonyl, obtained through the reaction of 1,3-butadiene with ruthenium pentacarbonyl with hydrochloric acid in carbon tetrachloride or hexane.

SUMMARY OF THE INVENTION

A process has now been discovered which is generally applicable for the production of π-allyl ruthenium tricarbonyl halides.

Such products are obtained by reacting ruthenium tetracarbonyl trimer, at elevated temperatures and under an inert gas atmosphere, with allyl halides of the formula:

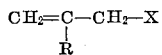

wherein R is selected from the group consisting of hydrogen and alkyl radicals, preferably lower alkyls, and X is a halide selected from the group consisting of chlorine, bromine and iodine.

DETAILED DESCRIPTION OF THE INVENTION

The reaction will usually proceed at a temperature above 30° C. and preferably within the range 50–90° C.

Any of the commonly known inert gases may be employed. Noble gases such as argon or nitrogen may be utilized, although the use of nitrogen is preferred.

The reaction is carried out in an organic solvent, preferably aliphatic or aromatic hydrocarbons, for example isooctane or benzene, or ketones such as acetone. Illustrative examples of other solvents which may be used include propane, n-pentane, cyclohexane, toluene, xylene, ethyl benzene, n-octane, cyclohexanone, 1,4 dioxane and isopropyl ether.

The novel compounds produced by this process are especially suitable as catalysts in carbonylization reactions, for example the production of hydroquinone from acetylene, carbon monoxide and water.

In the absence of indications to the contrary, all proportions and concentrations of materials are expressed on a weight basis.

The following examples will further illustrate the invention.

Example 1

This example illustrates the production of π-allyl-ruthenium tricarbonyl chloride by the process of this invention. In a shake-up autoclave made of stainless steel with a capacity of 125 ml. a glass flask, open on top, and containing 1.0 g. [Ru(CO)$_4$]$_3$, 8 ml. of isooctane and 2.8 g. of allyl chloride were inserted. The reaction vessel was washed out twice with N$_2$ and finally N$_2$ was forced in up to a pressure of 5 atm. While shaking, the autoclave was heated to 90° C. and this temperature was maintained for 10 hours. The temperature of the vessel was then cooled. The resulting liquid reaction mixture contained 0.187 g. of solid π-allyl ruthenium tricarbonyl chloride, which was separated off through filtration. Further 0.6 g. were isolated during the cooling off to −80° C. The yield amounted to 64.5%. The raw product (0.787 g.) was recrystallized (twice) from isooctane. There resulted 0.57 g. of bright yellow C$_3$H$_5$Ru(CO)$_3$Cl having a melting point of 75–77° C.

Example 2

π-allyl ruthenium tricarbonyl bromide was produced by reacting a suspension of 2.02 g. [Ru(CO)$_4$]$_3$ in 30 ml. of isooctane with 14.3 g. of allyl bromide by heating while stirring in a nitrogen atmosphere to 60–70° C. After 7 hours, 0.882 g. of crystallized π-allyl ruthenium tricarbonyl bromide was separated off through filtration from the yellow-colored reaction solution. An additional 1.632 were isolated through cooling to −80° C. and 0.290 g. through evaporation of solvent. The yield amounted to 97.3%. After recrystallization from isooctane, 2.1 g. of yellow C$_3$H$_5$Ru(CO)$_3$Br resulted with a melting point of 89–91° C.

Example 3

π-allyl ruthenium tricarbonyl iodide was produced by reacting 1.49 g. of [Ru(CO)$_4$]$_3$ in 30 ml. of isooctane with 9.0 g. of allyl iodide by heating while stirring in a nitrogen atmosphere to 60–70° C. After recrystallization from isooctane, C$_3$H$_5$Ru(CO)$_3$I melting at 69–70° C. was obtained in a quantity of 0.75 g., corresponding to a yield of 40%. The color of the compound was orange.

Example 4

Following the same procedure as in Example 2, 1.29 g. [Ru(CO)$_4$]$_3$ were reacted in 20 ml. of isooctane with 9.2 g. of 2-methyl-allyl chloride. 1.49 g. were isolated through cooling to −80° C. The yield amounted to 90.0%. After recrystallization from isooctane, 0.65 of C$_4$H$_7$Ru(CO)$_3$Cl were obtained. The melting point was at 94–96° C. The color of the compound was bright yellow.

The following Table I illustrates the results of an elemental analysis of the compounds produced by the present invention.

TABLE I

| Compound | X | Found, percent | | | | | Calculated, percent | | | | |
|---|---|---|---|---|---|---|---|---|---|---|---|
| | | C | H | X | Ru | M[1] | C | H | X | Ru | M |
| $Ru(CO)_3C_3H_5X$ | Cl | 27.87 | 1.93 | 13.9 | 38.30 | 256.1 | 27.55 | 1.928 | 13.56 | 38.65 | 261.8 |
| $Ru(CO)_3C_3H_5X$ | Br | 23.35 | 1.69 | 26.9 | 32.42 | 323.0 | 23.53 | 1.645 | 26.11 | 33.02 | 306.08 |
| $Ru(CO)_3C_3H_5X$ | I | 19.95 | 1.39 | ([2]) | 27.52 | 391 | 20.41 | 1.427 | 35.94 | 28.63 | 353.09 |
| $Ru(CO)_3C_4H_7X$ | Cl | 30.1 | 2.65 | ([2]) | 36.91 | 288.2 | 30.5 | 2.56 | 12.86 | 36.67 | 275.69 |

[1] M=molecular weight which was determined by the cryoscopic method using benzene.
[2] Not determined.

Example 5

This example illustrates the use of the compound of the present invention as catalysts in the carbonylization reaction of acetylene, carbon monoxide and water to produce hydroquinone. In a shake-up autoclave of stainless steel with a capacity of 485 ml. a closed glass vial containing 0.123 g. $C_3H_5Ru(CO)_3Cl$ and a steel ball were inserted. Subsequently the autoclave was evacuated, 177 g. of tetrahydrofuran, 9 g. of water and 0.251 mole of acetylene were put in and CO was impressed up to a pressure of 152 atm. The autoclave was heated to 230° C. without shaking, whereby the pressure rose to 331 atm. Then the autoclave was turned around, whereby the glass vial broke and the catalyst was released. After 130 minutes it was cooled and relaxed, the reaction mixture was distilled and from the residue (13.77 g.), hydroquinone was obtained through extraction with ethyl ether. After distilling the ether off and after sublimation (1.5–2 mm. Hg), 8.15 g. of hydroquinone could be obtained (melting point 170–172° C.), corresponding to a yield of 59.0%.

$C_3H_5Ru(CO)_3Br$ and $C_3H_5Ru(CO)_3I$ were also employed in the same manner and similar results were obtained.

The principle, preferred embodiments and modes of operation of the present invention have been described in the foregoing specification. However, it should be understood that the invention which is intended to be protected herein may be practiced otherwise than as described without departing from the appended claims.

What we claim is:
1. A process for the production of allyl ruthenium tricarbonyl halide which comprises: reacting ruthenium tetracarbonyl trimer at temperatures above 30° C. with an allyl halide of the formula:

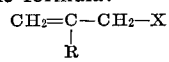

wherein R is selected from the group consisting of hydrogen and alkyl radicals with from 1 to 4 carbon atoms, and X is a halide selected from the group consisting of chlorine, bromine and iodide, said reaction being conducted in an organic solvent under an inert gas atmosphere.

2. A process as defined in claim 1 wherein said reaction is conducted at a temperature within the range 50–90° C.
3. A process as defined in claim 1 wherein said inert gas is nitrogen.
4. π-allyl ruthenium tricarbonyl chloride.
5. π-allyl ruthenium tricarbonyl bromide.
6. π-allyl ruthenium tricarbonyl iodide.
7. 2-methyl-π-allyl ruthenium tricarbonyl chloride.

References Cited

Murdoch et al., Helvitica Chimica Acta, 55 (1962), pp. 1927–33.

Plowman et al., Z. Naturforschg., 17b, 575–77.

TOBIAS E. LEVOW, Primary Examiner

A. P. DEMERS, Assistant Examiner

U.S. Cl. X.R.

252—429, 431; 260—621